United States Patent
Stouraitis et al.

(10) Patent No.: US 12,242,894 B2
(45) Date of Patent: Mar. 4, 2025

(54) TECHNIQUE FOR HARDWARE ACTIVATION FUNCTION COMPUTATION IN RNS ARTIFICIAL NEURAL NETWORKS

(71) Applicant: Khalifa University of Science and Technology, Abu Dhabi (AE)

(72) Inventors: Athanasios Stouraitis, Abu Dhabi (AE); Sakellariou Vasileios, Abu Dhabi (AE); Vasileios Paliouras, Patras (GR); Ioannis Kouretas, Patras (GR); Hani Saleh, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 35 days.

(21) Appl. No.: 18/193,635

(22) Filed: Mar. 31, 2023

(65) Prior Publication Data
US 2023/0385115 A1 Nov. 30, 2023

(30) Foreign Application Priority Data
May 24, 2022 (GR) .............................. 20220100431

(51) Int. Cl.
*G06F 9/50* (2006.01)
*G06F 7/72* (2006.01)

(52) U.S. Cl.
CPC .............. *G06F 9/5027* (2013.01); *G06F 7/72* (2013.01)

(58) Field of Classification Search
None
See application file for complete search history.

(56) References Cited

U.S. PATENT DOCUMENTS 6,898,613 B1 * 5/2005 Robinson ................ G06F 7/729
708/491
10,387,122 B1 * 8/2019 Olsen ..................... G06N 3/063

OTHER PUBLICATIONS

Valueva, M.V et al., Application of the residue number system to reduce hardware costs of convolutional neural network implementation 2020, Elsevier,pp. 232-243. (Year: 2020).*
Wang, X. et al., ReTanh: An activation function with vanishing gradient resistance for SAE-based DNNs and its application to rotating machinery fault diagnosis, 2019, Elsevier, pp. 88-98. (Year: 2019).*
Abdelouahab, K. et al., PhD Forum:Why TahH is a Hardware Friendly Activation Function for CNNs, 2017,ACM, 3 pages. (Year: 2017).*
Bank-Tavakoli POLAR: A Pipelined/Overlapped FPGA-Based LSTM Accelerator,2020,IEEE,pp. 838-842. (Year: 2020).*
Chervyakov ,N.I. et al.,Residue Number System-Based Solution for Reducing the Hardware Cost of a Convolutional Neural Network. 2020, Elsevier ,439-453. (Year: 2020).*

(Continued)

*Primary Examiner* — Eric Coleman
(74) *Attorney, Agent, or Firm* — Kilpatrick Townsend & Stockton LLP (57) ABSTRACT

A device can be used to implement a neural network in hardware. The device can include a processor, a memory, and a neural network accelerator. The neural network accelerator can be configured to implement, in hardware, a neural network by using a residue number system (RNS). At least one function of the neural network can have a corresponding approximation in the RNS system, and the at least one function can be provided by implementing the corresponding approximation in hardware.

17 Claims, 7 Drawing Sheets

(56) References Cited

OTHER PUBLICATIONS

Lin, Liang Yu. et al., Residue Number System Design Automation for Neural Network Acceleration, 2020,IEEE,2 pages. (Year: 2020).*

M. Carreras, G. Deriu, and P. Meloni, "Flexible acceleration of convolutions on FPGAs: NEURAghe 2.0," in CPS Summer School, PhD Workshop, 2019.

M. Zainab, A. R. Usmani, S. Mehrban, and M. Hussain, "FPGA Based Implementations of RNN and CNN: A Brief Analysis," in 2019 International Conference on Innovative Computing (ICIC), Nov. 2019, pp. 1-8.

J. Sim, S. Lee, and L. Kim, "An energy-efficient deep convolutional neural network inference processor with enhanced output stationary dataflow in 65-nm CMOS," IEEE Transactions on Very Large Scale Integration (VLSI) Systems, vol. 28, No. 1, pp. 87-100, Jan. 2020.

E. Bank-Tavakoli, S. A. Ghasemzadeh, M. Kamal, A. Afzali-Kusha, and M. Pedram, "POLAR: A Pipelined/Overlapped FPGA-Based LSTM Accelerator," IEEE Transactions on Very Large Scale Integration (VLSI) Systems, vol. 28, No. 3, pp. 838-842, Mar. 2020.

E. Azari and S. Vrudhula, "An Energy-Efficient Reconfigurable LSTM Accelerator for Natural Language Processing," in 2019 IEEE Interna-tional Conference on Big Data (Big Data), Dec. 2019, pp. 4450-4459.

A. Marchisio, M. A. Hanif, F. Khalid, G. Plastiras, C. Kyrkou, T. Theocharides, and M. Shafique, "Deep Learning for Edge Computing: Current Trends, Cross-Layer Optimizations, and Open Research Chal-lenges," in 2019 IEEE Computer Society Annual Symposium on VLSI (ISVLSI), 2019, pp. 553-559.

A. Munir, E. Blasch, J. Kwon, J. Kong, and A. Aved, "Artificial Intel-ligence and Data Fusion at the Edge," IEEE Aerospace and Electronic Systems Magazine, vol. 36, No. 7, pp. 62-78, 2021.

M. Valueva, N. Nagornov, P. Lyakhov, G. Valuev, and N. Chervyakov, "Application of the residue number system to reduce hardware costs of the convolutional neural network implementation," Mathematics and Computers in Simulation, vol. 177, pp. 232-243, 2020. [Online]. Available: https://www.sciencedirect.com/science/article/pii/S0378475420301580.

N. Samimi, M. Kamal, A. Afzali-Kusha, and M. Pedram, "Res-DNN: A Residue Number System-Based DNN Accelerator Unit," IEEE Trans- actions on Circuits and Systems I: Regular Papers, vol. 67, No. 2, pp. 658-671, 2020.

M. Abdelhamid and S. Koppula, "Applying the residue number system to network inference," arXiv preprint arXiv:1712.04614, 2017.

S. Salamat, M. Imani, S. Gupta, and T. Rosing, "RNSnet: In-Memory Neural Network Acceleration Using Residue Number System," 11 2018, pp. 1-12.

K. Greff, R. K. Srivastava, J. Koutn'ik, B. R. Steunebrink, and J. Schmid-huber, "LSTM: A Search Space Odyssey," IEEE Transactions on Neural Networks and Learning Systems, vol. 28, No. 10, pp. 2222-2232, Oct. 2017.

Y. Kong and B. Phillips, "Fast scaling in the Residue Number System," IEEE Trans. VLSI Syst., vol. 17, pp. 443-447, Mar. 2009.

E. Olsen, "RNS hardware matrix multiplier for high precision neural network acceleration: "RNS TPU"," May 2018, pp. 1-5.

H. Vergos, C. Efstathiou, and D. Nikolos, "Diminished-one modulo 2n+ 1 adder design," IEEE Transactions on Computers—TC, vol. 51, pp. 1389-1399, Jan. 2002.

C. Efstathiou, H. Vergos, G. Dimitrakopoulos, and D. Nikolos, "Efficient diminished1 modulo 2n + 1 multipliers," IEEE Transactions on Computers—TC, vol. 54, pp. 491-496, Apr. 2005.

B. Liao, J. Zhang, C. Wu, D. McIlwraith, T. Chen, S. Yang, Y. Guo, and F. Wu, "Deep sequence learning with auxiliary information for traffic prediction," in Proceedings of the 24th ACM SIGKDD International Conference on Knowledge Discovery & Data Mining, 2018, pp. 537-546.

E. Azari and S. Vrudhula, "ELSA: a throughput-optimized design of an LSTM accelerator for energy-constrained devices," ACM Trans-actions on Embedded Computing Systems (TECS), vol. 19, No. 1, pp. 1-21, 2020.

I. Kouretas and V. Paliouras, "Hardware aspects of long short term memory," in 2018 25th IEEE International Conference on Electronics, Circuits and Systems (ICECS), 2018, pp. 525-528.

D. Kadetotad, V. Berisha, C. Chakrabarti, and J.-S. Seo, "A 8.93—TOPS/W LSTM recurrent neural network accelerator featuring hierarchical coarse-grain sparsity with all parameters stored on-chip," IEEE Solid-State Circuits Letters, vol. 2, No. 9, pp. 119-122, 2019.

* cited by examiner

TECHNIQUE FOR HARDWARE ACTIVATION FUNCTION COMPUTATION IN RNS ARTIFICIAL NEURAL NETWORKS

CROSS-REFERENCES TO RELATED APPLICATIONS

This application claims priority to Greek Application No. 20220100431 filed May 24, 2022, the entire contents of which are hereby incorporated for all purposes in their entirety.

BACKGROUND

In recent years artificial intelligence (AI) applications and services have been flourishing. Deep Neural Networks (DNNs) have emerged as a means to tackle problems of real-life complexity in computer vision, natural language processing, speech recognition, and many other areas. In order to handle the increased computational load, GPUs, Application-Specification Integrated Circuits (ASICs), and FPGA accelerators have been proposed. Due to rapid evolution in mobile computing and Internet-of-Things (IoT) and the need for local near-sensor data processing, implementation of DNNs on low-resource devices emerges as a major challenge.

SUMMARY

A device can include a processor, a non-transitory computer-readable memory, and a neural network accelerator. The non-transitory computer-readable memory can include instructions executable by the processor to cause the processor to perform one or more operations associated with at least one of an input to or an output from a neural network. The neural network accelerator may be configured to implement, in hardware, at least a part of the neural network by using a residue number system (RNS). At least one function of the neural network may have a corresponding approximation in the RNS, and the at least one function may be provided by implementing the corresponding approximation in hardware.

In some embodiments, the corresponding approximation may include a piecewise linear approximation, and the piecewise linear approximation may be configured to minimize a maximum approximation error.

In some embodiments, the at least one function may include at least one of a tanh function or a sigmoid function, and the corresponding approximation may include at least one of a scaling operation or a comparison operation.

In some embodiments, the corresponding approximation may be configured to partition a domain of the at least one function into a plurality of successive intervals by a sequence of points and to use the sequence of points for approximation.

In some embodiments, the corresponding approximation may be configured to use a first factor $a_i$ and a second factor $b_i$ for an interval of the plurality of successive intervals, and the first factor and the second factor may be constrained for the interval to "1" and "0" when the at least one function is a tanh function and to "¼" and "½" when the at least one function is a sigmoid function.

In some embodiments, the plurality of successive intervals may include five successive intervals.

In some embodiments, the corresponding approximation may be configured to perform a base extension of adding one or more changes to an RNS base for a division function.

In some embodiments, the instructions, upon execution by the processor, may configure the device to: receive an input, perform a base extension on the input, generate a mapped value based on the base extension, and determine an index using the mapped value and by using at least a lookup table operation.

A method can be implemented by a device that includes a neural network accelerator. Data may be received to be processed by a neural network, which may be configured to implement, in hardware, at least a part of the neural network by using a residue number system (RNS). At least one function of the neural network may have a corresponding approximation in the RNS, and the at least one function may be provided by implementing the corresponding approximation in hardware. An input can be generated to the neural network accelerator based on the data. An output of the neural network accelerator can be received.

In some embodiments, the neural network may include a long short-term memory (LSTM) layer, and the data may include sinusoidal data. Additionally, receiving the data to be processed by the neural network may include receiving the sinusoidal data via the LSTM layer.

In some embodiments, the data may be received in an RNS domain and may be represented by a modulus set that includes one or more residue representations of the data. The one or more residue representations may include a representation range of the data.

In some embodiments, the method may additionally include performing a base extension on the representation range of the data to determine a last-channel offset between the data and mapped input data.

In some embodiments, the method may additionally include using a lookup table operation to determine a particular interval based on the base extension. The lookup table operation may involve distinguishing between a first interval of a plurality of intervals and a second interval of the plurality of intervals using the mapped input data.

In some embodiments, the method may additionally include determining a plurality of intervals by partitioning the representation range of the data into a plurality of sub-intervals. A number of sub-intervals included in the plurality of sub-intervals may be equal to one or more values included in the modulus set.

In some embodiments, the method may additionally include determining a plurality of intervals without converting the data to a binary representation. Determining the plurality of intervals may involve one-channel-wide operations.

A system can include a first computing device and a second computing device. The second computing device may be communicatively coupled to the first computing device and configured to receive input data from the first computing device and generate output data to transmit to the first computing device. The second computing device can include a processor, a non-transitory computer-readable memory, and a neural network accelerator. The non-transitory computer-readable memory may include instructions executable by the processor to cause the processor to perform one or more operations associated with at least one of an input to or an output from a neural network. The neural network accelerator may be configured to implement, in hardware, at least a part of the neural network by using a residue number system (RNS). At least one function of the neural network may have a corresponding approximation in the RNS, and the at least one function may be provided by implementing the corresponding approximation in hardware.

In some embodiments, the corresponding approximation may include a piecewise linear approximation, and the piecewise linear approximation may be configured to minimize a maximum approximation error.

In some embodiments, the at least one function may comprise at least one of a tanh function or a sigmoid function, and the corresponding approximation may include at least one of a scaling operation or a comparison operation.

In some embodiments, the corresponding approximation may be configured to partition a domain of the at least one function into a plurality of successive intervals by a sequence of points and to use the sequence of points for approximation.

In some embodiments, the corresponding approximation may be configured to use a first factor $a_i$ and a second factor $b_i$ for an interval of the plurality of successive intervals, and the first factor and the second factor may be constrained for the interval to "1" and "0" when the at least one function is a tanh function and to "¼" and "½" when the at least one function is a sigmoid function.

DETAILED DESCRIPTION

The underlying arithmetic representation of a machine learning model (e.g., a deep neural network-DNN) can play a vital role in the performance of a hardware accelerator in terms of power, delay, and area. A Residue Number System (RNS) can be used in edge DNN (and/or other types of machine learning model) accelerators. The RNS can improve efficiency at implementing addition and multiplication, as the arithmetic circuits operate in parallel channels with shorter critical paths and can support higher frequencies. Additionally or alternatively, complex non-linear activation functions can be harder to implement in RNS and can introduce considerable overhead. Other techniques to implement RNS-based DNN accelerators may commonly rely on simple activations functions, such as the Rectified Linear Unit (ReLU), which can be relatively easily implemented in RNS.

The usage of RNS can be extended to more complex DNN models such as Recurrent Neural Networks (RNNs), which may involve the efficient implementation of other activation functions. Using the derived piecewise linear approximations discussed below, which minimize the maximum approximation error, activation functions such as tanh and a are reduced to scaling and comparison operations. The operations are not straightforward to implement in the RNS domain. A fully-RNS based solution can be used that may not require conversions to conventional binary representations. The techniques disclosed herein can manage to perform the interval selection required for the piecewise approximations without explicitly performing comparisons, which are complex to implement in RNS.

Figure 1:
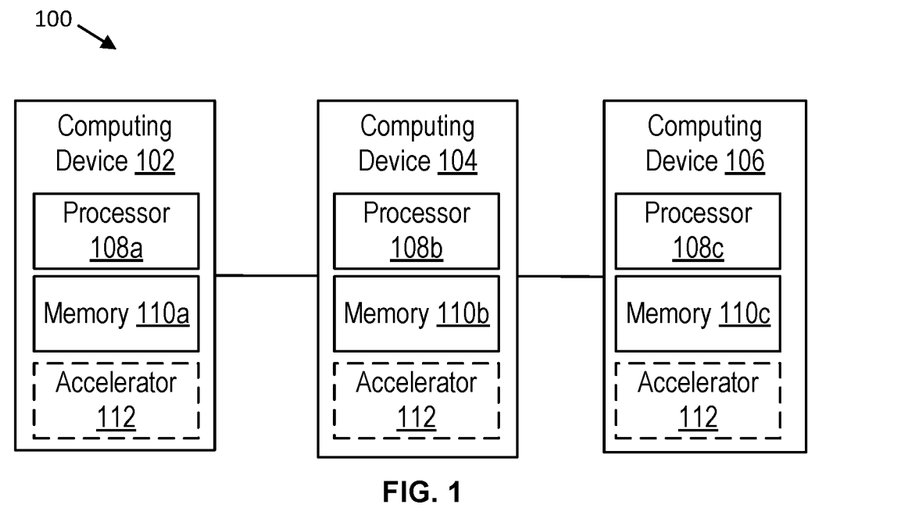
FIG. 1 is a block diagram of a computing system that can implement a neural network in hardware according to some embodiments.

FIG. 1 is a block diagram of a computing system 100 that can implement a neural network in hardware according to some embodiments. The computing system 100 can include a first computing device 102, a second computing device 104, a third computing device 106, and any other computing device that can be used to implement a neural network in hardware. In some examples, the first computing device 102 may be or include a use device, such as a cellular device, a sensor device, etc., the second computing device 104 may be or include a computer server (e.g., an edge server), and the third computing device 106 may be or include another computer server (e.g., one in a data center), though the first computing device 102, the second computing device 104, and/or the third computing device 106 may be or include any other type of computing devices or any combination thereof. The first computing device 102, the second computing device 104, and the third computing device 106 may each, or in various sub-combinations, be communicatively coupled with one another over a set of data communication network(s).

Each one of the first computing device 102, the second computing device 104, and/or the third computing device 106 can include one or more computer processors, a non-transitory computer-readable medium (e.g., computer memory), and other suitable components for a computing device. In some examples, and as illustrated in FIG. 1, the first computing device 102 can include processor 108a and memory 110a, the second computing device 104 can include processor 108b and memory 110b, and the third computing device 106 can include processor 108c and memory 110c. Additionally, and as illustrated in FIG. 1, at least one of the first computing device 102, the second computing device 104, or the third computing device 106 may include an accelerator 112, which is illustrated with a dashed line. In some examples, two or more (or each) of the first computing device 102, the second computing device 104, or the third computing device 106 may include the accelerator 112. The accelerator 112 can implement, in hardware, one or more components (e.g., layers) of a machine learning model (e.g., a DNN) and/or functions (including approximation functions) used in the machine learning model.

In examples in which the first computing device 102 is a mobile computing device, the first computing device 102 may generate and transmit input data to the second computing device 104. In examples in which the second computing device 104 includes the accelerator 112, the second computing device 104 may save the input data and/or use the input data to generate output data via the machine learning model implemented, at least in part, via the accelerator 112. In other examples, the second computing device 104 may save the input data and/or transmit the input data, or a processed or pre-processed version thereof, to the third computing device 106. In this case, the third computing device 106 can use the accelerator 112 to generate the output data using the input data, and the third computing device 106 can transmit the output data to the second computing device 104. The second computing device 104 can transmit the output data, whether generated or received, to the first computing device 102.

Generally, the accelerator 112 can implement, in hardware, one or more components (e.g., layers) of a machine learning model (e.g., a DNN) and/or functions (including approximation functions) used in the machine learning model. In the interest of clarity of explanation, an LSTM layer of a DNN and an approximation function are described herein below. However, the embodiments of the present disclosure are not limited as such and can apply to other types of approximation functions and/or other layers that use one or more functions that can be approximated using such approximation function type(s).

A common RNN block can include the Long Short-Term memory (LSTM) block. An input sequence can include $Y=y_1, y_2, \ldots, y_t$, where $y_t$ is the input of the RNN at time t. An LSTM can be defined by the following set of equations:

$$i_t = \sigma(W^i x_t \oplus U^i h_{t-1} \oplus b^i) \quad f_t = \sigma(W^f x_t \oplus U^f h_{t-1} \oplus b^f)$$

$$o_t = \sigma(W^o x_t \oplus U^o h_{t-1} \oplus b^o) \quad c_t = f_t \odot c_{t-1} \oplus i_t \odot c^{\sim}_t$$

$$c^{\sim}_t = \tanh(W^c x_t \oplus U^c h_{t-1} \oplus b^c) \quad h_t = o_t \odot \tanh(c_t);$$

where $W^k$, $U^k$, and $b^k$, with k=i, f, o, c can be parameters of the RNN and can be computed during the training process. Symbols $\odot$ and $\oplus$ may denote element-wise multiplication and addition, respectively. The input of the LSTM layer can include $x_t$ and, for the input LSTM layer, it may hold that $y_t = x_t$.

Figure 2:
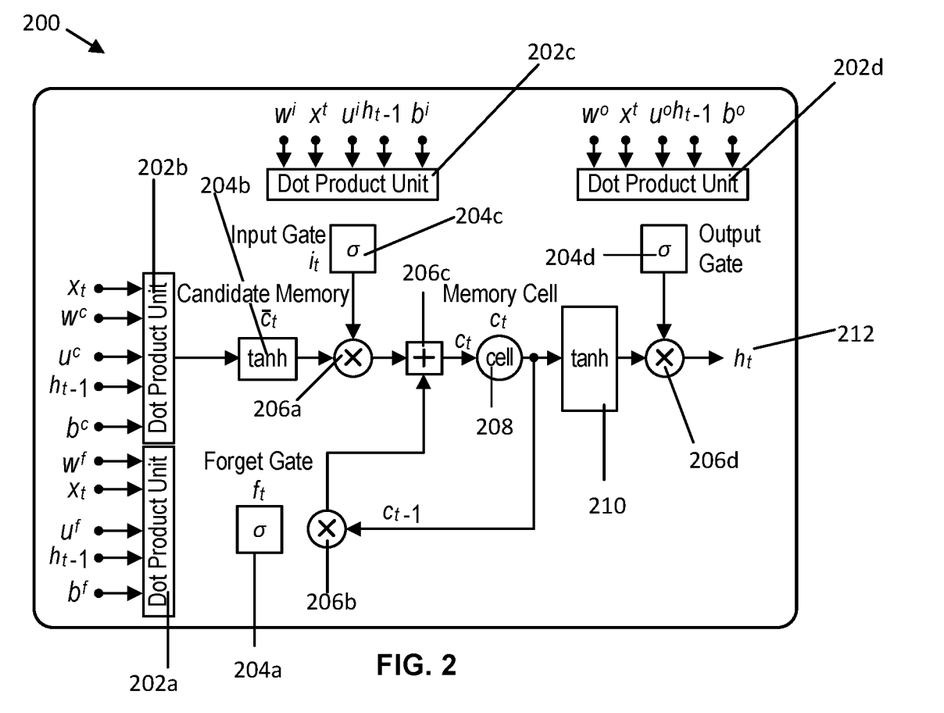
FIG. 2 is one example of an LSTM layer architecture according to some embodiments.

FIG. 2 illustrates one example of an LSTM layer architecture 200 according to some embodiments. The LSTM layer architecture can include various dot-product unit inputs 202*a-d*, one or more gates 204*a-d* corresponding to the various dot-product unit inputs 202*a-d*, various operations 206*a-d*, a memory cell 208, an activation function 210, and any other suitable components for the LSTM layer architecture 200. The one or more gates 204*a-d* can include a forget gate 204*a*, a candidate memory gate 204*b*, a first sigmoid gate 204*c*, and a second sigmoid gate 204*d*, though other suitable gates can be included in the LSTM layer architecture 200. A first operation 206*a* can involve multiplication of an output of the candidate memory gate 204*b* and an output of the first sigmoid gate 204*c*. A second operation 206*b* can involve multiplication of an output of the forget gate 204*a* and an output of the memory cell 208. A third operation 206*c* can involve addition of an output of the first operation 206*a* and an output of the second operation 206*b*. A fourth operation 206*d* can involve multiplication of an output of the activation function 210 and an output of the second sigmoid gate 204*d*. An output of the fourth operation 206*d* can include an output 212 of the LSTM layer architecture 200.

In a Residue Number System (RNS), numbers can be represented by their residues with respect to a modulus set $\{m_1, m_2, \ldots, m_n\}$, which may be the base of the representation. An integer X can be mapped to a set of residues $$X \mapsto (x_1, x_2, \ldots, x_n), x_i = X \bmod m_i.$$

In the RNS representation, real number arithmetic in the interval of $[-r, r]$ can be mapped to the integer range $[0, M-1]$, where $M = \prod_{i=1}^{n} m_i$. Addition or multiplication mod $m_i$ performed by independently adding or multiplying mod $m_i$ the residues in each channel without inter-channel communication.

Approximations of the common activations of tanh and sigmoid can be determined. The approximations can combine hardware simplicity and sufficient accuracy. Among the wide variety of techniques to approximate a function $f(x)$, the maximum absolute error $|\varepsilon|$ can be minimized by partitioning the domain of $f(x)$ into successive intervals, $\mathcal{I}_i$, by a sequence of points $\{x_i: i=0, 1, \ldots, N-1\}$, i.e., $i=[x_i, x_{i+1}]$, and approximating $f(x)$, $x \in \mathcal{I}_i$, by $p_i(x) = a_i x + b_i$. Error minimization can be achieved by requiring the same $|\varepsilon|$ for all $\mathcal{I}_i$, with alternating error signs in successive intervals and at the interval boundaries. The maximum error in $\mathcal{I}_i$ can be observed at point $z_i$, $x_i < z_i < x_{i+1}$, then $f'(z_i) - a_i = 0$, $f(x_i) - a_i x_i - b_i = (-1)_i |\varepsilon|$, and $f(z_i) - a_i z_i - b_i = (-1)^{i+1} |\varepsilon|$. Additional continuity constraints can be imposed at $\mathcal{I}_i$ boundaries, i.e., $p_i(x_i) = p_{i+1}(x_i)$.

Figure 3:
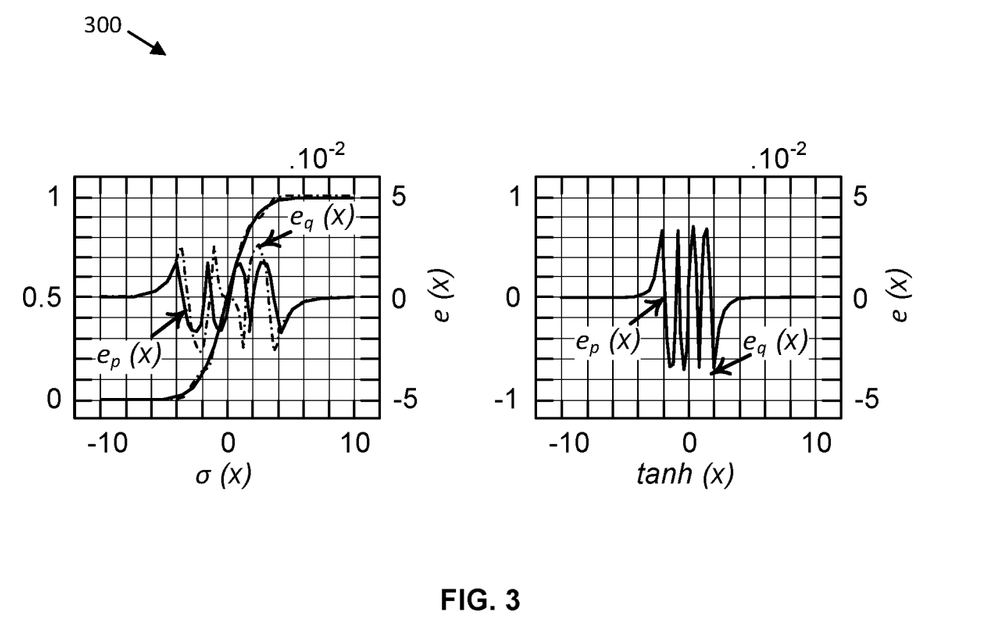
FIG. 3 is piecewise graph of linear activation approximations and errors for five intervals according to some embodiments.

FIG. 3 is piecewise graph 300 of linear activation approximations and errors for five intervals according to some embodiments. By numerically solving the nonlinear system of constraints for $a_i$, $b_i$, $x_i$, $z_i$, $\varepsilon$, for all i, the approximations shown in FIG. 3 as solid lines can be derived and can achieve the errors $e_p(x)$. Additionally, by constraining the slopes and biases in the central interval $[x_1, x_2]$ to 1 and 0 for tanh and ¼ and ½ for $\sigma$, and solving for the remainder of parameters, the error around x=0 may be small. The former choice for $\sigma(x)$ (without slope constraints, p(x)) and the latter for tanh(x) (with slope constraints q(x)) may perform optimally. Table I summarizes selected approximations.

TABLE I

APPROXIMATION PARAMETERS

| | tanh, q(x) | | | σ, p(x) | | |
|---|---|---|---|---|---|---|
| i | $x_i$ | $a_i$ | $b_i$ | $x_i$ | $a_i$ | $b_i$ |
| — | $-\infty$ | 0 | $-1$ | $-\infty$ | 0 | 0 |
| 0 | $-1.8148$ | 0.3513 | $-0.3624$ | $-4.0352$ | 0.0602 | 0.2428 |
| 1 | $-0.5587$ | 1 | 0 | $-1.6529$ | 0.2158 | 0.5 |
| 2 | 0.5587 | 0.3513 | 0.3624 | 1.6529 | 0.0602 | 0.7572 |
| 3 | 1.8148 | 0 | 1 | 4.0352 | 0 | 1 |

The LSTM layer architecture 200 of FIG. 2 can include several parallel dot-product units, which can perform the matrix-vector multiplications of the input and hidden state with the weight matrices, pointwise adders and multipliers, tanh and α activation units, and buffers to store cell and hidden state vectors.

The above approximations may use scaling factors $a_i$, $a_i < 1$ for the activation functions, which may imply division by a constant. Division in RNS can be significantly simplified when the divisor is one of the moduli. Assuming the number to be scaled is $X \mapsto (x_1, x_2, \ldots, x_n)$, and the modulus to divide by is $m_1$, $x_1$ can initially be subtracted from all channels to obtain the nearest (e.g., smaller) number that is divisible by $m_1$. Since moduli may be co-prime to $m_1$, a single value $k_i$ may exist for each channel such that $k_i m_1 \bmod m_i = x_i$, which can be obtained using a lookup table operation. The channel that corresponds to $m_1$ can involve special handling since, after the subtraction, the channel has a zero value and the value $k_1$ may not be directly obtained since $m_1 k_1 \bmod m_1$ is zero. But the residues in channels 2 to n can define the result. Hence, to obtain the value for the divisor channel from the rest of the channels, a base extension can be used. Base extension can involve adding one or more channels to the RNS base. The Szabo-Tanaka method, which is based on an intermediate Mixed-Radix representation, or any other suitable technique can be used.

In order to determine the interval that includes the input, multiple comparisons can be performed with the interval edge points. However, since comparison is costly in RNS, a technique that partitions the representation range into K sub-intervals at once can be used, where K is one of the moduli. The technique is described by Algorithm 1. Assuming the last moduli $m_n$ is selected for this purpose, the algorithm can map the input $X=(x_1, x_2, \ldots, x_n)$ to the nearest number (e.g., smaller than X) of the form $X'=(0, 0, \ldots, x_n')$ and can use the value of $x_n'$ to determine the interval. To do this, base extension of the first n−1 channels can be performed to get k which is the last-channel offset between X and X' and is given by $k=(X \bmod \Pi_1^{n-1} m_i) \bmod m_n$. Then, $x_n'=(x_n-k) \bmod m_n$ can be obtained and used to distinguish among the various intervals using a lookup table operation. This process may correspond to calculating $$\left\lfloor \frac{X}{m_1 \cdot m_2 \cdots m_{n-1}} \right\rfloor$$

and may partition the interval into $K=m_n$ sub-intervals, defined by the integer multiples of $\Pi_{i=1}^{n-1} m_i$. The algorithm can be used for piecewise approximations with up to $x_n$ intervals.

The algorithms can avoid any intermediate conversion to binary representations. Additionally, associated arithmetic operations and table look-ups involved may be one-channel wide.

Algorithm 1 Proposed algorithm for Interval Selection.

Figure 4:
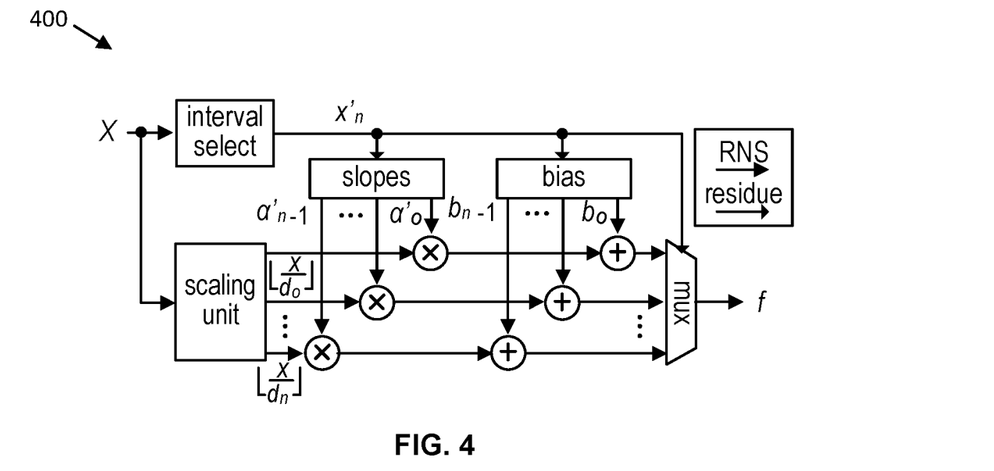
FIG. 4 is an example of a generalized block diagram for a piece-wise linear approximation of the activation function $f$ in the RNS domain according to some embodiments.

Input: $X = (x_1, x_2, \ldots, x_n)$
Output: the index i, such that $X \in \mathcal{L}_i$
1: $K = BE(m_n, (x_1, x_2, \ldots, x_{n-1}))$    base extension
2: $x_n' = (x_n - k) \bmod m_n$    computes $x_n'$
3: $i = LUT(x_n')$    obtain lookup table to generate index i For the RNS hardware implementation, five-interval approximations can be used, as an example, to offer a good compromise between accuracy and complexity. A general, piecewise-linear activations unit, such as piecewise-linear activations unit 400 as illustrated in FIG. 4, may scale multiplication by a constant and a bias addition to obtain $a_i X + b_i$, where i is the output of the interval selection unit such that $X \in \mathcal{J}_i$, $a_i X$ is the integer product $$a_i' \left\lfloor \frac{X}{d_i} \right\rfloor, \left\lfloor \frac{X}{d_i} \right\rfloor$$

is the scalar output, and $d_i$ is a product of some of the base moduli. Using a multiplier can be avoided by exploiting the particular coefficients of Table I. The RNS base {3,5,7,31, 32} can be used, which can provide more than 16 bits of dynamic range, can include low-cost moduli ($2^k$, $2^k \pm 1$), and can provide a selection of scaling factors to use in the activation approximations.

Based on Table I, tanh(x) can be reduced to:

$$p(x) = \begin{cases} x, & |x| < x_0 \\ \frac{x}{3} \pm 0.36, & x_0 \le |x| \le x_1 \\ \pm 1, & |x| > x_1 \end{cases}$$

for $x \in [-r, r]$, which may correspond to a slope of 0.33 (instead of 0.35) and may involve a scaling by 3 (e.g., a modulo of the base) and an addition with the bias. Assuming $m_n=32$, the available decision points can include $$x_i = \frac{2r \cdot i}{32}.$$

Thus, $$x_0 = 1.875 = \frac{15}{8} \text{ and } x_1 = 0.62 = \frac{5}{8}$$

can be selected.

FIG. 4 is an example of a generalized block diagram for a piece-wise linear approximation of the activation function $f$ in the RNS domain according to some embodiments. In some examples, FIG. 4 depicts the piecewise-linear activations unit 400, which can include the RNS tanh unit 500, which is illustrated in FIG. 5.

Figure 5:
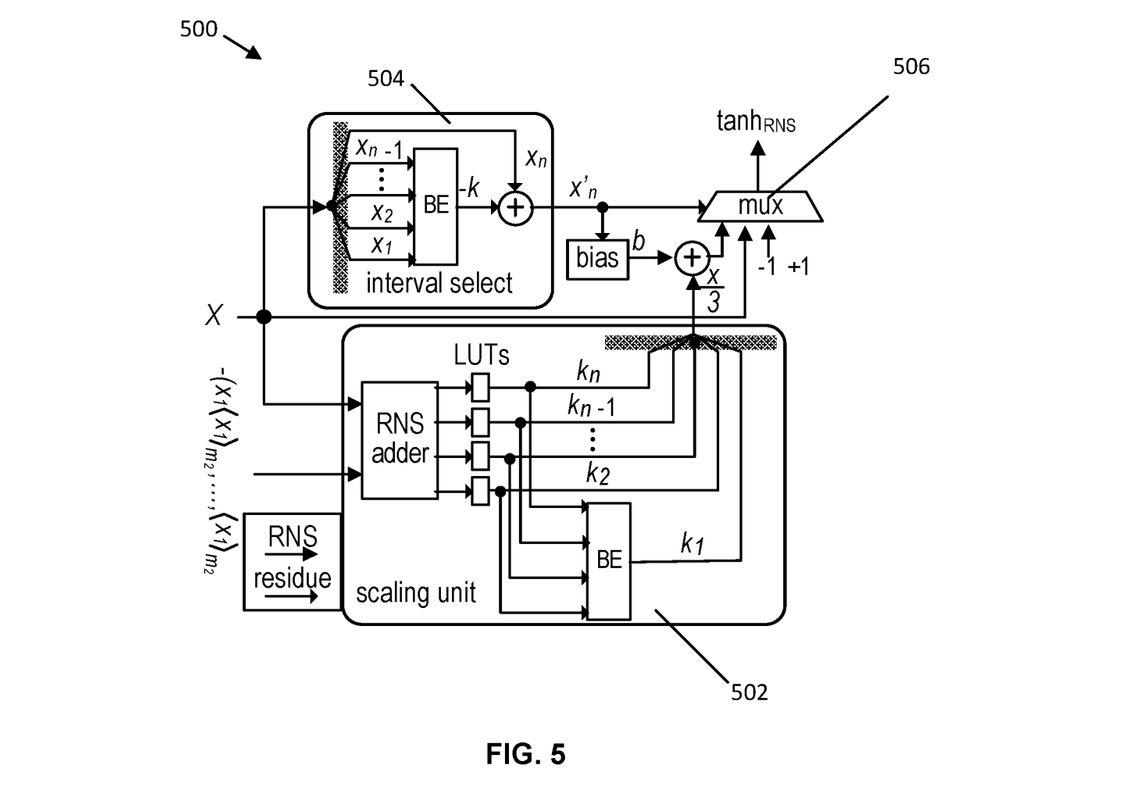
FIG. 5 is a hardware implementation of RNS tanh according to some embodiments.

FIG. 5 is hardware implementation of RNS tanh according to some embodiments. The RNS tanh unit 500 can include a scaling unit 502, an interval selection unit 504, which can implement Algorithm 1, and a modulo adder 506.

Using Table I, the sigmoid function (e.g., σ(x)) can be approximated by:

$$p(x) = \begin{cases} 0, & x < -x_0 \\ \frac{x}{15} + 0.25, & -x_0 \le x < -x_1 \\ \frac{x}{5} + 0.5, & -x_1 \le x \le x_1 \\ \frac{x}{15} + 0.75, & x_1 < x \le x_0 \\ 1, & x > x_0 \end{cases},$$

which can correspond to slopes of 0.2 (instead of 0.21) and 0.066 (instead of 0.060). The scaling can take place in two stages. For example, the value for the third interval can be determined by scaling by 5, and then this value can be scaled by 3 to get the value x/15 for the second and fourth interval. The a unit may have a similar implementation to tanh of FIG. 4, with an additional scaling unit. The decision points for the interval selection are ±4, ±1.625. The tanh and a units can use three- and five-stage pipelining, respectively.

A systolic MAC architecture can compute the dot products for the LSTM block. Utilizing special forms of moduli, such as $2^k$, $2^k \pm 1$, can decrease the area overhead of the modulo operation. End-around carry adders can implement arithmetic mod $2^k-1$. Diminished-1 arithmetic can be used for operations mod $2^k+1$. Modulo $2^k$ operations can be performed by simply keeping the k LSBs.

Two test cases can be used to evaluate the min-max piecewise-linear approximations using 3, 5, and 7 intervals and their impact on the performance of an LSTM network. The results are summarized in Table II. In the applications, the networks can be trained with the tanh and a functions, and the approximations can be used in the evaluation on the test set.

TABLE II

COMPARISON OF APPROXIMATIONS

| Approximation | Sinwave Regression (MSE) | Traffic prediction (MSE) |
|---|---|---|
| Exact σ and tanh | 8e−5 | 13.29 |
| Ex. σ + Naive 3-inter. tanh | 6e−2 | 18.08 |
| Ex. σ + minmax 5-inter. tanh | 1.9e−3 | 16.83 |
| Ex. σ + minmax 7-inter. tanh | 1.9e−3 | 17.59 |
| Naive 3-interv. σ + Ex. tanh | 4.6e−3 | 17.07 |
| minmax 5-inter. σ + Ex. tanh | 4.65e−4 | 13.65 |
| minmax 7-inter σ + Ex. tanh | 3.27e−4 | 13.36 |
| Naive 3-interv. (σ + tanh) | 4.6e−2 | 17.84 |
| minmax 5-inter (σ + tanh) (Impl.) | 1.5e−3 | 13.80 |

In the first test case, the Q-traffic dataset is used. Here, an RNN model with 32 LSTM cells can be trained to predict average traffic speeds (e.g., in km/h). When the naive 3-interval tanh approximation tanh(x)≈x, x∈[−1,1] is used, there may be a significant accuracy degradation of approximately 36%. When the 5-interval minmax approach is used, the accuracy degradation may drop to approximately 26%. For the a approximation, a degradation of approximately 28% can be observed when using simple 3-interval approximation, which drops to approximately 2% and approximately 0.5% for 5 and 7 intervals, respectively. Using the 3-interval σ and tanh approximations, the accuracy degradation may be approximately 34% versus approximately 3% for 5 intervals. In some examples, a model using approximations of the same number of intervals can outperform a model where only one approximation is used.

In the second test case, an RNN of 10 LSTM cells can be trained to output the values of a sinusoidal wave of a given frequency by receiving, as input, some initial values of the sequence. Similarly, to the first test case described above, 5 interval approximations and 7 interval approximations may offer a considerable improvement (e.g., more than one order of magnitude smaller error) over simple 3-interval approximations.

Synthesis results of the LSTM units using a 22-nm GlobalFoundries Library with 0.5 V nominal voltage are illustrated in Table III. In order to compare the traditional binary (BNS) and RNS hardware implementations of the LSTM block of FIG. 2, the efficiency of the block as performance/area unit can be defined. The performance can be measured in terms of MAC operations/second (OPS). The efficiency $$\eta = \frac{OPS}{A}$$

can be given by $$\eta = \frac{N_{units} \cdot f}{A_{dot} + A_{act}} = \frac{N_{units} \cdot f}{N_{units} \cdot A_{MAC} + 2\, A_{tanh} + 3\, A_\sigma} \quad (1)$$

where $N_{units}$ is the total number of parallel MACs in the dot-product unit, $f$ is the clock frequency, and $A_{MAC}$, $A_{tanh}$ and $A_\sigma$ are the areas of the MAC, tanh, and σ units, respectively.

For the implementation of the BNS activation units, a similar approach can be used in which the input can be multiplied by the respective coefficient based on the interval that includes the input. By increasing the number of parallel MAC units that compute dot products, throughput can be increased along with area. Based on Equation 1, as the number of parallel units increases, the effect of the overhead of activations on efficiency may diminish.

Figure 6:
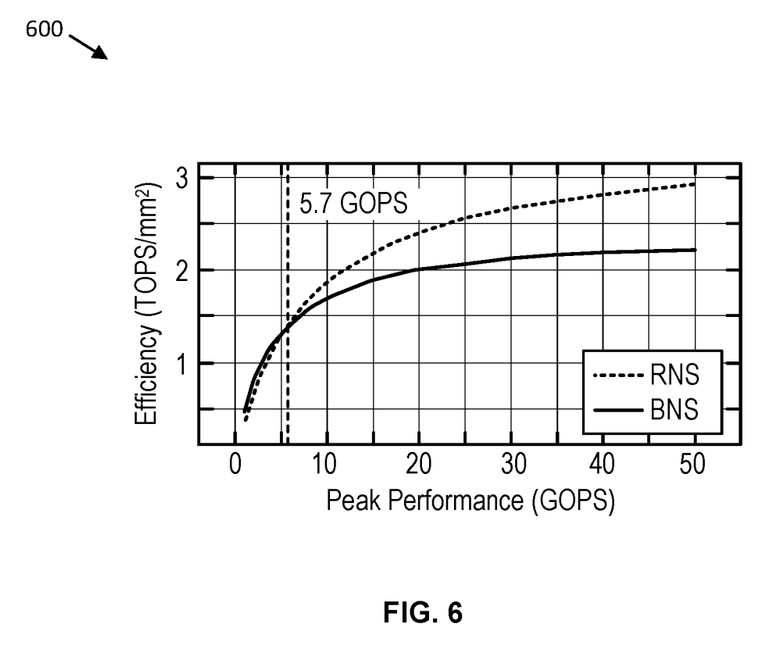
FIG. 6 is a graph of efficiency vs target peak performance for RNS and BNS LSTM cells according to some embodiments.

FIG. 6 is a graph of efficiency vs target peak performance for RNS and BNS LSTM cells according to some embodiments. In some examples, FIG. 6 illustrates the efficiency in terms of GOPS/mm$^2$ for a target peak performance based on Equation 1 and the implementation details of the blocks of Table III. The RNS block can operate at a maximum frequency of approximately 1.2 GHz, while the BNS block can reach up to approximately 740 MHz. For a peak performance requirement greater than 5.71 GOPS, the RNS implementation may outperform the binary counterpart and the RNS to BNS efficiency ratio can converge to approximately 1.40.

An LSTM block with 64 parallel MAC units and a hidden dimension of 128 can be synthesized, and a 65-nm TSMC library can be used. Area and power estimations in Table IV may refer to the LSTM block contribution (taken from the area/power breakdown given by the authors), and not the SRAM cells. Thus, efficiencies can be scaled accordingly. Compared to the ELSA accelerator, the RNS LSTM block can achieve approximately 1.32× higher energy efficiency with approximately 48% less area. In some examples, a compression unit can be used, which may reduce the used operations by a factor of approximately 16. Thus, the reported performance refers to effective GOPS which can be approximately 16× higher than the actual GOPS performed. If a similar compression ratio is assumed, the RNS block can be up to approximately 4.17× more energy efficient or higher.

TABLE III

RNS AND BNS LSTM BLOCK UNITS COMPARISON

| | Area (μm$^2$) | | Power (μW) | | Delay (ns) | |
|---|---|---|---|---|---|---|
| | Units | | | | | |
| | BNS | RNS | BNS | RNS | BNS | RNS |
| MAC fast | 391 | 461 | 267 | 300 | 0.85 | 0.53 |
| MAC opt.* | 310 | 357 | 91 | 144 | 1.34 | 0.83 |
| tanh | 345 | 382 | 98 | 110 | 1.34 | 0.81 |
| σ | 349 | 551 | 99 | 124 | 1.34 | 0.83 |

*since the slower activation units determine the maximum frequency the MAC is optimized for area at that frequency

TABLE IV

COMPARISONS TO PRIOR WORK

| | [21] | [23]* | RNS LSTM |
|---|---|---|---|
| Technology | 65-nm | 65-nm | 22-/65-nm |
| Frequency (MHz) | 322 | 8−80 | 1000/710 |
| Voltage (V) | 1.1 | 0.68-1 | 0.5/1.1 |
| Area (mm$^2$) | 0.4 | — | 0.04/0.21 |
| Bit precision (Wgt., Act.) | 8.16 | 6.13 | 8.16 |
| Peak Performance (GOPS) | 27 | 24.60-164.95** | 160/113.6 |
| Power (mW) | 12.28 | 1.49-54.24 | 19.9/39 |
| Power efficiency (GOPS/mW) | 2.19 | 11.16-3.04** | 8.04/2.91 |

*results for 2 different dataset are given
**reported performance refers to effective GOPS which are 16x higher actual GOPS performed.

Figure 7:
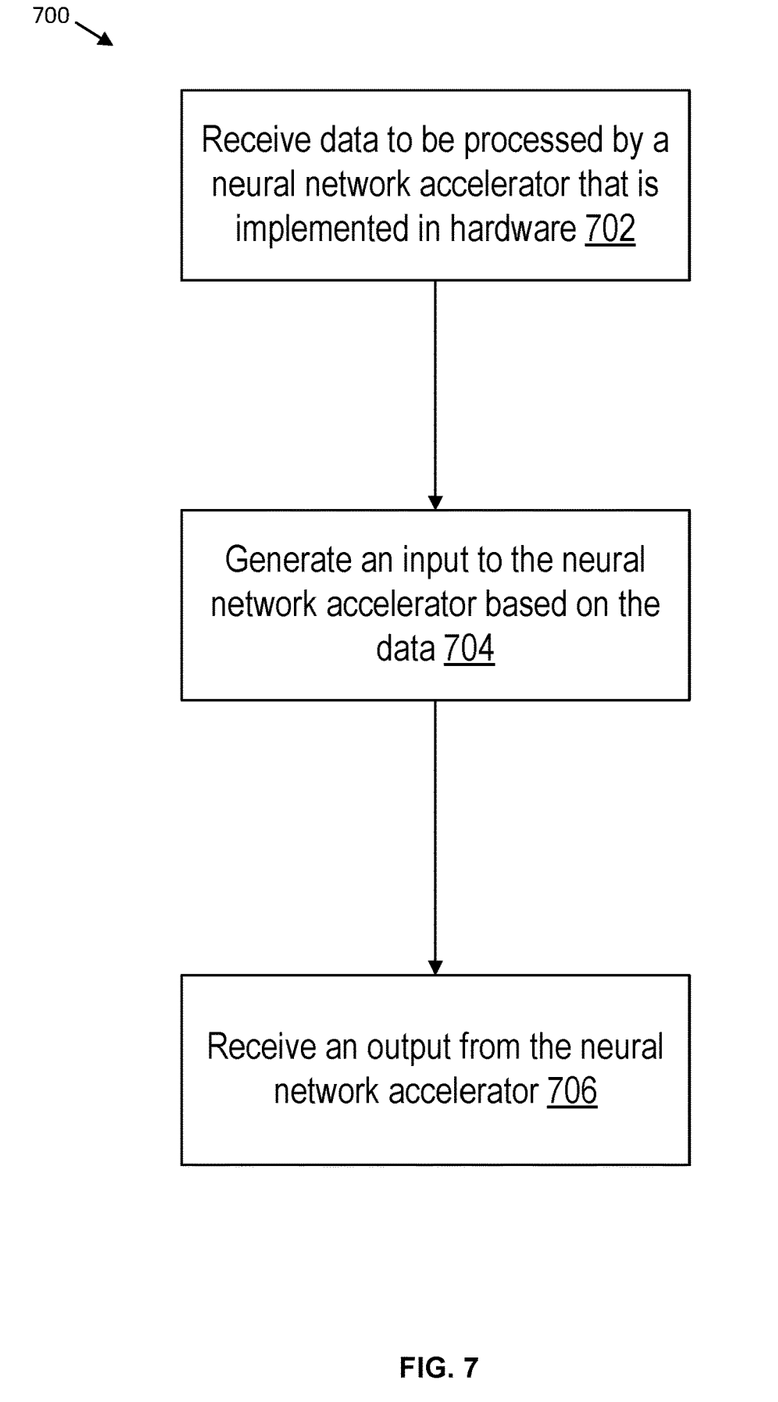
FIG. 7 is a flowchart of a process for using a neural network implemented at least in part in hardware according to some embodiments.

FIG. 7 is a flowchart of a process 700 for using a neural network implemented at least in part hardware according to some embodiments. At block 702, the process 700 involves receiving data to be processed by the neural network. The neural network may be implemented at least in part in hardware, for example as part of a neural network accelerator. In some examples, the neural network accelerator may be similar or identical to the accelerator 112 as illustrated and described with respect to FIG. 1. Additionally, the data may be transmitted by a computing device, which may be similar to the first computing device 102.

At block 704, the process 700 involves generating an input for the neural network accelerator based on the received data. The input may be generated to be input to the neural network based on a configuration of an input layer to such neural network. At block 706, the process 700 involves receiving output from the neural network accelerator. The neural network accelerator may generate the output using one or more approximations of one or more activation functions. The output can be transmitted back to the computing device (e.g., the first computing device 102) that transmitted the data received at the block 702.

Figure 8:
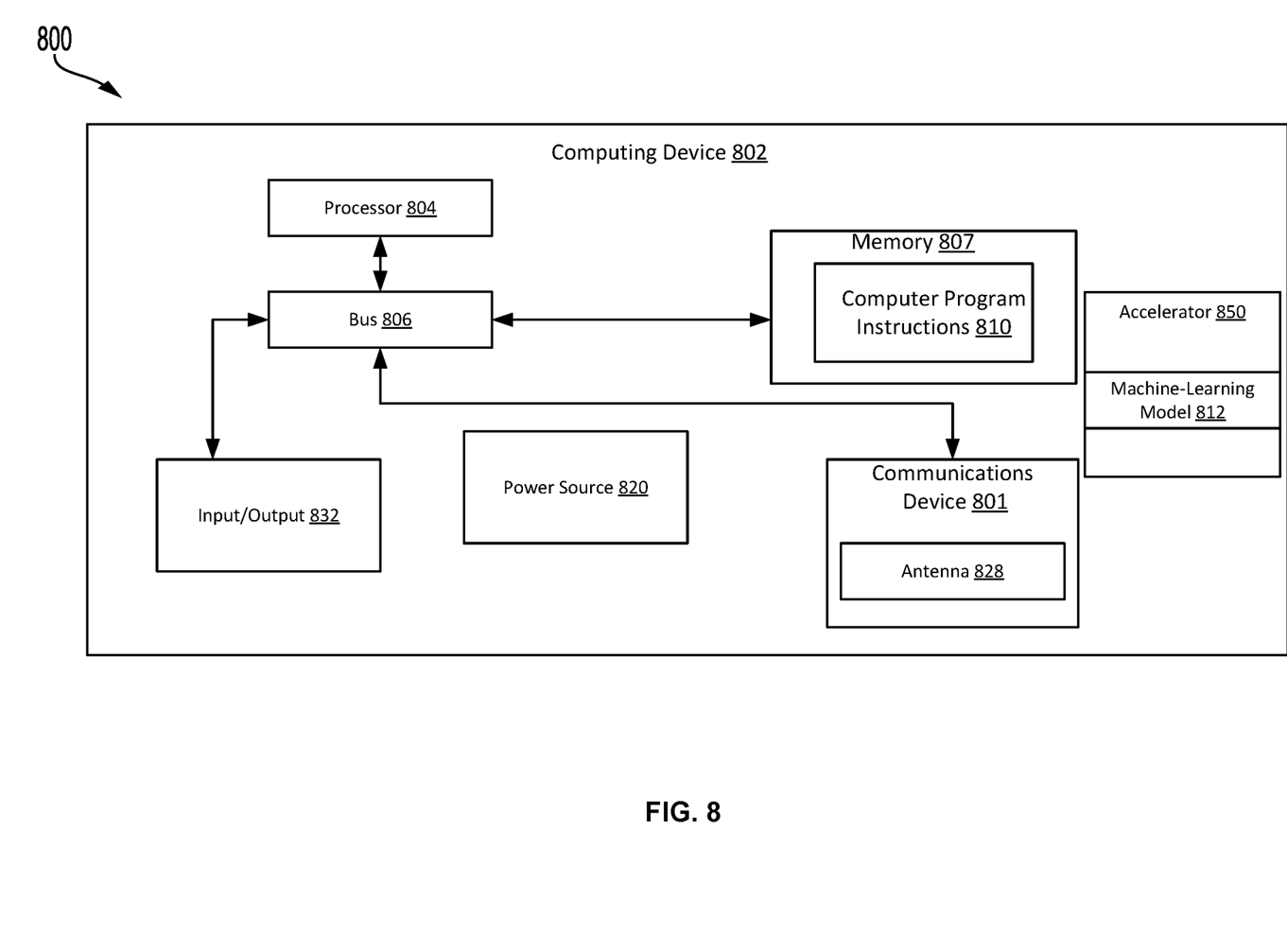
FIG. 8 is a block diagram of a computing system that can implement an RNS according to some embodiments.

FIG. 8 is a block diagram of a computing system 800 that can include one or more RNS LSTM blocks (e.g., that can be implemented as hardware or a combination of hardware and software) and can perform the operations described herein, according to some embodiments. The components shown in FIG. 8, such as a processor 804, a memory 807, a power source 820, an accelerator 850, a communications device 801, etc., may be integrated into a single structure, such as within a single housing of a computing device 802. Alternatively, the components shown in FIG. 8 can be distributed from one another and in electrical communication with each other.

The computing system 800 may include the computing device 802. The computing device 802 can include the processor 804, the memory 807 (e.g., non-volatile), and a bus 806. The processor 804 can execute one or more of the operations disclosed herein, for example, relating to a min-max approach for approximating functions. The processor 804 can execute instructions stored in the memory 807 to perform the operations. The processor 804 can include one processing device or multiple processing devices or cores. Non-limiting examples of the processor 804 include a Field-Programmable Gate Array ("FPGA"), an application-specific integrated circuit ("ASIC"), a microprocessor, etc.

The processor 804 can be communicatively coupled to the memory 807 via the bus 806. The memory 807 may include any type of memory device that retains stored information when powered off. Non-limiting examples of the memory 807 may include EEPROM, flash memory, or any other type of non-volatile memory. In some examples, at least part of the memory 807 can include a medium from which the processor 804 can read the instructions. A computer-readable medium can include electronic, optical, magnetic, or other storage devices capable of providing the processor 804 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, Perl, Java, Python, etc.

In some examples, the memory 807 can include computer program instructions 810 that can be executed by the processor 804 to perform various operations. Additionally, the accelerator 850 can include or otherwise generate, train, and/or apply a machine-learning model 812. For example, the accelerator 850 can execute the machine-learning model 812 to determine approximations of functions using a min-max approach, as described herein. The machine-learning model 812 can include a CNN, a DNN, an RNN, or any other suitable model for performing the operations described herein.

The computing device 802 can include a power source 820, which can be in electrical communication with the computing device 802 and the communications device 801. In some examples, the power source 820 can include a battery, or a suitable electrical cable, and can include an AC signal generator. The computing device 802 can operate the power source 820 to apply a transmission signal to an antenna 828 to generate electromagnetic waves that convey data relating to the approximations to other systems. For example, the computing device 802 can cause the power source 820 to apply a voltage with a frequency within a specific frequency range to the antenna 828. This can cause the antenna 828 to generate a wireless transmission. In other examples, the computing device 802, rather than the power source 820, can apply the transmission signal to the antenna 828 for generating the wireless transmission.

The computing device 802 can additionally include an input/output interface 832, which can connect to a keyboard, pointing device, display, and other suitable computer input/output devices. Input can be provided using the input/output interface 832. Data relating to the approximations of the functions can be displayed via the input/output interface 832.

Figure 9:
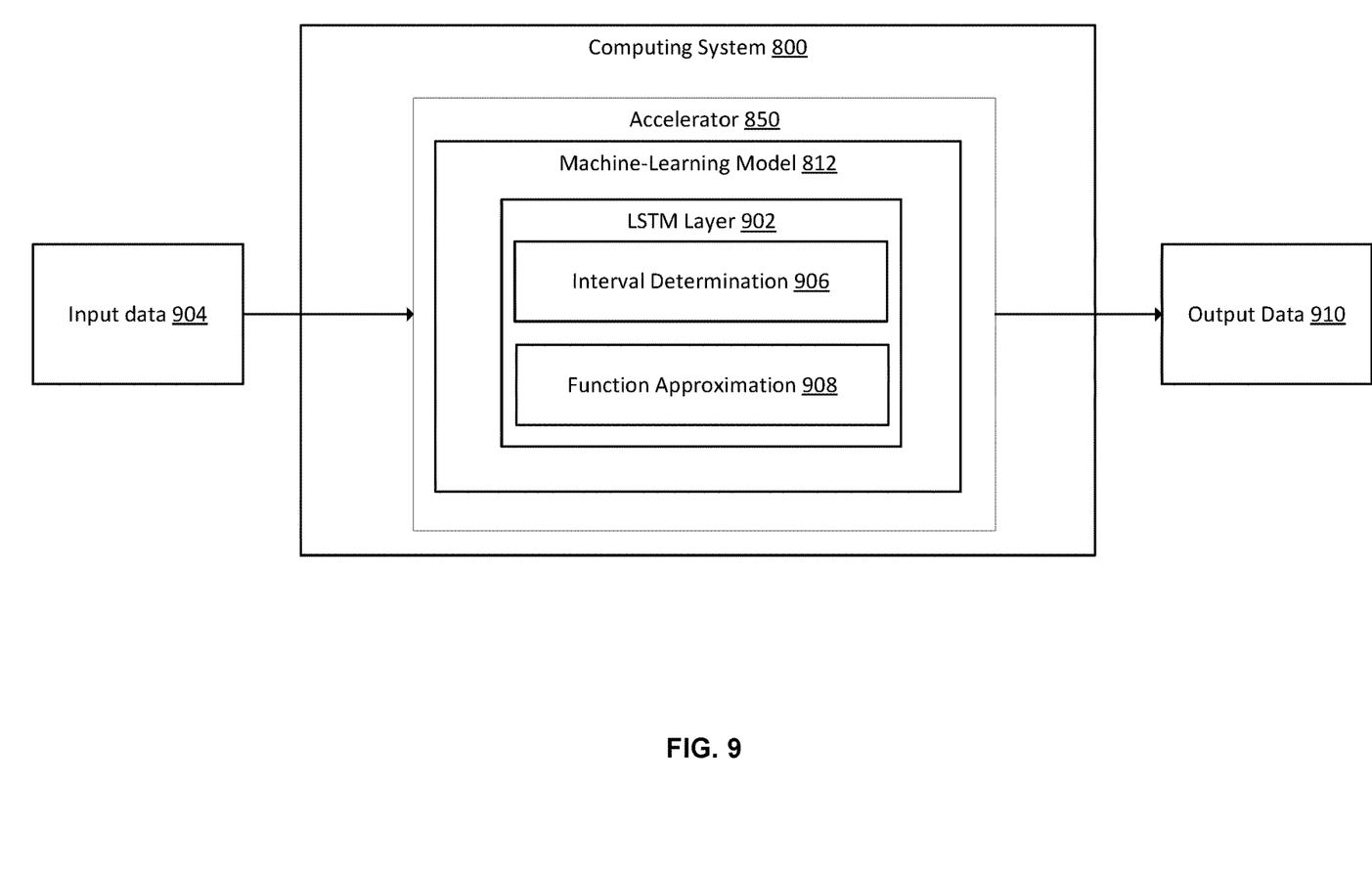
FIG. 9 is an example of a flow diagram of data with respect to the computing system of FIG. 6.

FIG. 9 is a flow diagram of data with respect to the computing system 800 of FIG. 8 according to some embodiments. The computing system 800 can include the accelerator 850 that includes machine-learning model 812, and the machine-learning model 812 can include various different layers for performing the operations described herein. In one such example, and as illustrated in FIG. 9, the machine-learning model 812 can include an LSTM layer 902, though the illustrated machine-learning model 812 can include other suitable layers that are not illustrated.

The computing system 800 can receive, via the machine-learning model 812, input data 904 that can include any suitable data that can be used to approximate functions, as disclosed herein. For example, the input data 904 can include data, similar to test case 1 and test case 2, relating to Q-traffic data, sinusoidal data, and the like. The input data 904 can be fed into the LSTM layer 902 that can include an interval determination 906 and a function approximation 908. The LSTM layer 902 can use the input data 904 to determine one or more intervals (e.g., the interval determination 906) for the input data and to use the one or more intervals to approximate one or more functions (e.g., the function approximation 908) such as tanh and sigmoid functions. The computing system 800 can return, via the machine-learning model 812, output data 910 that can include the function approximations and any other suitable outputs from the machine-learning model 812.

In this work, improved accuracy approximations of the tanh and a functions using the minmax approach were derived and implemented in RNS using a simplified interval selection procedure. The RNS LSTM block was shown to be more area-efficient than a binary counterpart when targeting high-performance designs.

What is claimed is:

1. A device comprising:
   a processor;
   a non-transitory computer-readable memory comprising instructions executable by the processor to cause the processor to perform one or more operations associated with at least one of an input to or an output from a neural network; and a neural network accelerator configured to implement, in hardware, at least a part of the neural network by using a residue number system (RNS), wherein:
at least one function of the neural network has a corresponding approximation in the RNS,
the at least one function is provided by implementing the corresponding approximation in hardware, and
the operations include:
receiving the input,
performing a base extension on the input,
generating a mapped value based on the base extension, and
determining an index by at least using the mapped value and a lookup table operation.

2. The device of claim 1, wherein the corresponding approximation includes a piecewise linear approximation, and wherein the piecewise linear approximation is configured to minimize a maximum approximation error.

3. The device of claim 1, wherein the at least one function comprises at least one of a tanh function or a sigmoid function, and wherein the corresponding approximation includes at least one of a scaling operation or a comparison operation.

4. The device of claim 1, wherein the corresponding approximation is configured to partition a domain of the at least one function into a plurality of successive intervals by a sequence of points and to use the sequence of points for approximation.

5. The device of claim 4, wherein the corresponding approximation is configured to use a first factor at and a second factor $b_i$ for an interval of the plurality of successive intervals, wherein the first factor and the second factor are constrained for the interval to "1" and "0" when the at least one function is a tanh function and to "¼" and "½" when the at least one function is a sigmoid function.

6. The device of claim 4, wherein the plurality of successive intervals includes five successive intervals.

7. The device of claim 1, wherein the corresponding approximation is configured to perform a base extension of adding one or more changes to an RNS base for a division function.

8. A method implemented by a device that includes a neural network accelerator, the method comprising:
receiving data to be processed by a neural network, the neural network accelerator configured to implement, in hardware, at least a part of the neural network by using a residue number system (RNS), wherein at least one function of the neural network has a corresponding approximation in the RNS, and wherein the at least one function is provided by implementing the corresponding approximation in hardware, wherein the data is received in an RNS domain and is represented by a modulus set that comprises one or more residue representations of the data, and wherein the one or more residue representations comprise a representation range of the data;
performing a base extension on the representation range of the data to determine a last-channel offset between the data and mapped input data;
generating an input to the neural network accelerator based on the data; and
receiving an output of the neural network accelerator.

9. The method of claim 8, wherein the neural network comprises a long short-term memory (LSTM) layer, wherein the data comprises sinusoidal data, and wherein receiving the data to be processed by the neural network comprises receiving the sinusoidal data via the LSTM layer.

10. The method of claim 8, further comprising using a lookup table operation to determine a particular interval based on the base extension, wherein the lookup table operation involves distinguishing between a first interval of a plurality of intervals and a second interval of the plurality of intervals using the mapped input data.

11. The method of claim 8, further comprising determining a plurality of intervals by partitioning the representation range of the data into a plurality of sub-intervals, wherein a number of sub-intervals included in the plurality of sub-intervals is equal to one or more values included in the modulus set.

12. The method of claim 8, further comprising determining a plurality of intervals without converting the data to a binary representation, and wherein determining the plurality of intervals involve one-channel-wide operations.

13. A system comprising:
a first computing device; and
a second computing device communicatively coupled to the first computing device and configured to receive input data from the first computing device and generate output data to transmit to the first computing device, the second computing device comprising:
a processor;
a non-transitory computer-readable memory comprising instructions executable by the processor to cause the processor to perform one or more operations associated with at least one of an input to or an output from a neural network; and
a neural network accelerator configured to implement, in hardware, at least a part of the neural network by using a residue number system (RNS), wherein:
at least one function of the neural network has a corresponding approximation in the RNS,
the at least one function is provided by implementing the corresponding approximation in hardware, and
the one or more operations include:
receiving the input,
performing a base extension on the input,
generating a mapped value based on the base extension, and
determining an index by at least using the mapped value and a lookup table operation.

14. The system of claim 13, wherein the corresponding approximation includes a piecewise linear approximation, and wherein the piecewise linear approximation is configured to minimize a maximum approximation error.

15. The system of claim 13, wherein the at least one function comprises at least one of a tanh function or a sigmoid function, and wherein the corresponding approximation includes at least one of a scaling operation or a comparison operation.

16. The system of claim 13, wherein the corresponding approximation is configured to partition a domain of the at least one function into a plurality of successive intervals by a sequence of points and to use the sequence of points for approximation.

17. The system of claim 16, wherein the corresponding approximation is configured to use a first factor $a_i$ and a second factor $b_i$ for an interval of the plurality of successive intervals, wherein the first factor and the second factor are constrained for the interval to "1" and "0" when the at least one function is a tanh function and to "¼" and "½" when the at least one function is a sigmoid function.

* * * * *